United States Patent [19]

Dirauf et al.

[11] Patent Number: 5,271,046
[45] Date of Patent: Dec. 14, 1993

[54] MANIPULATOR AND PROCESS FOR CARRYING OUT WORK IN THE CONNECTION-PIECE REGION OF A VESSEL, IN PARTICULAR NON-DESTRUCTIVE TESTING

[75] Inventors: Franz Dirauf, Ebensfeld; Roland Gottfried, Langensendelbach, both of Fed. Rep. of Germany

[73] Assignee: Siemens Aktiengesellschaft, Munich, Fed. Rep. of Germany

[21] Appl. No.: 952,522

[22] Filed: Nov. 30, 1992

Related U.S. Application Data

[63] Continuation of PCT/DE91/00430, May 23, 1951.

[30] Foreign Application Priority Data

May 30, 1990 [DE] Fed. Rep. of Germany ....... 4017600

[51] Int. Cl.[5] ........................................... G21C 17/007
[52] U.S. Cl. ............................................................ 376/249
[58] Field of Search ............................... 376/249, 260; 976/DIG. 210, DIG. 211, DIG. 213, DIG. 214

[56] References Cited

U.S. PATENT DOCUMENTS 4,474,064 10/1984 Naruse et al. ....................... 376/249
5,118,462  6/1992 Dirauf et al. ....................... 376/249

FOREIGN PATENT DOCUMENTS 0160305 11/1985 European Pat. Off. .
2600246  7/1976 Fed. Rep. of Germany .
2634158  2/1978 Fed. Rep. of Germany .
2620715 11/1980 Fed. Rep. of Germany .
3147296  6/1983 Fed. Rep. of Germany .

Primary Examiner—Daniel D. Wasil
Attorney, Agent, or Firm—Herbert L. Lerner; Laurence A. Greenberg

[57] ABSTRACT

A nuclear power plant includes a primary loop having a vessel with a connection piece. A manipulator for working in the vicinity of the connection piece, especially for non-destructive testing, includes two trolleys being moveable circumferentially of the connection piece. A jointed-shank arm disposed on the trolleys has two shanks each having first and second ends. Hinged supports are each disposed on a respective one of the trolleys and each support the first end of a respective one of the shanks. A crown hinge joins the second ends of the shanks together. A support for a tool or a test head is mounted on the crown hinge. A process for carrying out work in the connection-piece region with a maneuvering unit includes adjusting a position of each of the trolleys with a respective drive motor, pressing the tool or test head against a wall of the vessel with spring means acting upon the shanks, such as pneumatic or hydraulic cylinders, and maneuvering the crown hinge into a predetermined position and/or over a predetermined path by varying the position of at least one of the trolleys with a control device acting upon the drive motors.

8 Claims, 3 Drawing Sheets

MANIPULATOR AND PROCESS FOR CARRYING OUT WORK IN THE CONNECTION-PIECE REGION OF A VESSEL, IN PARTICULAR NON-DESTRUCTIVE TESTING

CROSS-REFERENCE TO RELATED APPLICATION

This application is a Continuation of International application Ser. No. PCT/DE91/00430, filed May 23, 1991.

The invention relates to a manipulator for working in a connection-piece or pipe region of a vessel of a primary loop in a nuclear power plant, particularly for non-destructive testing. The invention also relates to a process for maneuvering an appliance, in particular a test head.

The lines of the primary loop of a nuclear power plant are introduced into the pressure vessel through connection pieces and are joined by welding. Since the connection-piece region is one of the points under heavy strain, it is tested at regular intervals by non-destructive methods.

It is known to carry out such tasks with a manipulator that has an outrigger being disposed radially to the connection piece and having a test head being radially displaceable on the outrigger and being rerailed on an annular rail that surrounds the connection piece to be tested. In order to carry out the necessary motions in the testing operations, the manipulator has one drive in the circumferential direction of the connection piece and one drive in the radial direction. Through the use of mechanical devices, the outrigger in the radial direction is pressed against an outer vessel wall to be tested and is aligned tangentially. The vessel with the connection piece is surrounded by a biological shield and an insulation. Due to the fact that a gap between the vessel and the insulation or biological shield is sometimes very narrow, it is very difficult and not always possible to introduce the known manipulator into the annular gap, since the necessary structural height of the known outrigger prohibits its use in the very narrow annular gap.

During testing, the test head must be moved around the connection piece over concentric or elliptical paths. For technical testing reasons it is necessary to use various test heads, which must be manually replaced in the course of a test. The testing is made more difficult by the increased radiation in the vicinity of the test specimen and by the tight spaces. Changing the test head in the known equipment requires manual disassembly of the manipulator and is therefore very time-consuming and involves considerable radiation exposure to humans. Moreover, avoiding obstacles in the test region is not always possible, since in order to move the test head, the radial outrigger has a bottom frame with a spindle extending over its entire length and therefore has a pronounced overhang.

It is accordingly an object of the invention to provide a manipulator and a process for carrying out work in the connection-piece region of a vessel, which overcome the hereinafore-mentioned disadvantages of the heretofore-known devices and methods of this general type. The manipulator should be able to be introduced into the annular gap more easily than before and be able to work even in narrow annular gaps. Moreover, it is intended to enable the manipulator to shorten the time required for changing the test head and to reduce the radiation exposure to the human operators. The process should permit remote-controlled maneuvering of an appliance or a test head with a manipulator in tight spaces.

With the foregoing and other objects in view there is provided, in accordance with the invention, in a nuclear power plant including a primary loop having a vessel with a connection piece, a manipulator for working in the vicinity of the connection piece, in particular for non-destructive testing, comprising two trolleys being moveable circumferentially of the connection piece, a jointed-shank arm disposed on the trolleys, the jointed-shank arm including two shanks each having first and second ends, hinged supports each being disposed on a respective one of the trolleys and each sup-porting the first end of a respective one of the shanks, a crown hinge joining together the second ends of the shanks, and a support for a tool or a test head being mounted on the crown hinge.

In this way, a slender structural form is attained that makes it possible to us the manipulator in tight open spaces and to circumvent obstacles in the region to be tested. By adjusting the shanks, the radius of the test track or path can be decreased, which decreases the structural size of the manipulator. The manipulator is usable not only for testing purposes but also for maneuvering tasks in the connection-piece region of vessels.

In accordance with another feature of the invention, the second ends of the shanks have mutually meshing toothed ring segments with center points, and the support has pivot pins mounted thereon for supporting the toothed ring segments at the center points.

In accordance with a further feature of the invention, there are provided two spring means, especially pneumatic or hydraulic cylinders, each being disposed between a respective one of the trolleys and a respective one of the shanks for pressing the tool or test head against a region to be tested, and at least one angle encoder for detecting an inclination of at least one of the shanks relative to a reference plane.

In accordance with an added feature of the invention, there are provided two drive motors each having a position encoder and each being associated with a respective one of the trolleys, and a control unit having an arithmetic unit and being connected to the position encoders and to the angle encoders for controlling the drive motors.

In accordance with a concomitant feature of the invention, the hinged supports are cardan joints.

With the objects of the invention in view, there is also provided, in a process for carrying out work in a connection-piece region of a vessel of a primary loop in a nuclear power plant with a maneuvering unit including two trolleys being moveable circumferentially of or around the connection piece, hinged supports each being disposed on a respective one of the trolleys, a crown hinge, a jointed-shank arm on the trolleys including two shanks each having one end supported in a respective one of the hinged supports and another end being joined together by the crown hinge, and a support for a tool or a test head being mounted on the crown hinge, the improvement which comprises adjusting a position of each of the trolleys with a respective drive motor; pressing the tool or test head against a wall of the vessel with spring means acting upon the shanks, especially pneumatic/hydraulic cylinders; and maneuvering the crown hinge into a predeter-mined position and/or over a predetermined path by varying the position of at least one of the trolleys with a control device acting upon the drive motors.

Other features which are considered as characteristic for the invention are set forth in the appended claims.

Although the invention is illustrated and described herein as embodied in a manipulator and a process for carrying out work in the connection-piece region of a vessel, in particular non-destructive testing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
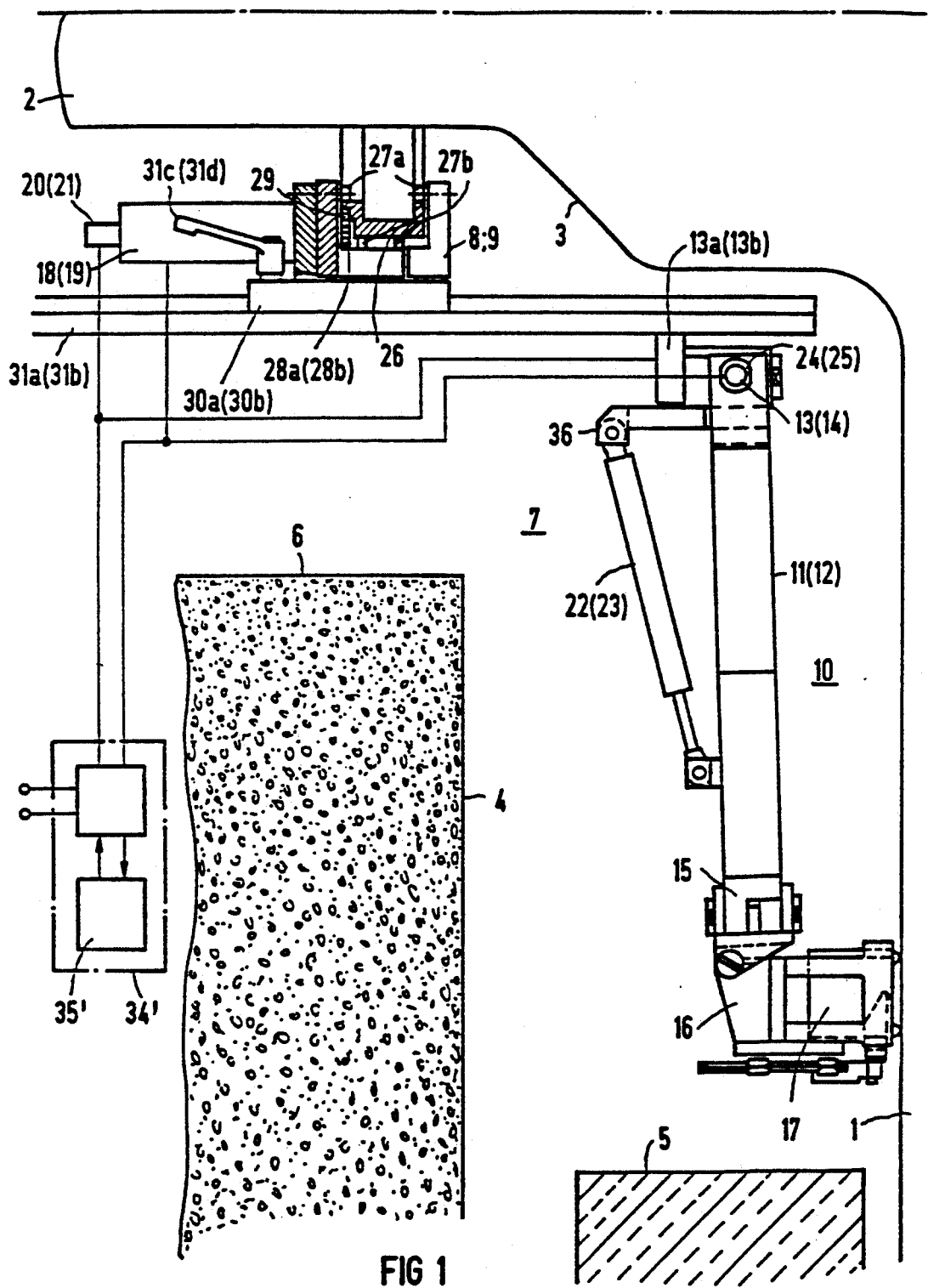
FIG. 1 is a fragmentary, diagrammatic, side-elevational view of a manipulator for testing a vessel in the region of a connection piece, which is taken along a line I—I of FIG. 2, in the direction of the arrows.

Referring now to the figures of the drawing in detail and first, particularly, to FIG. 1 thereof, there is seen a pipeline 2 which is introduced into a vessel 1 through a connection piece or pipe 3 and is joined to it by welding. The vessel 1 is surrounded by a biological shield 4 and a thermal insulation 5. At the entry point of the pipeline 2, the biological shield 4 has an opening 6, which is typically rectangular in shape.

Figure 2:
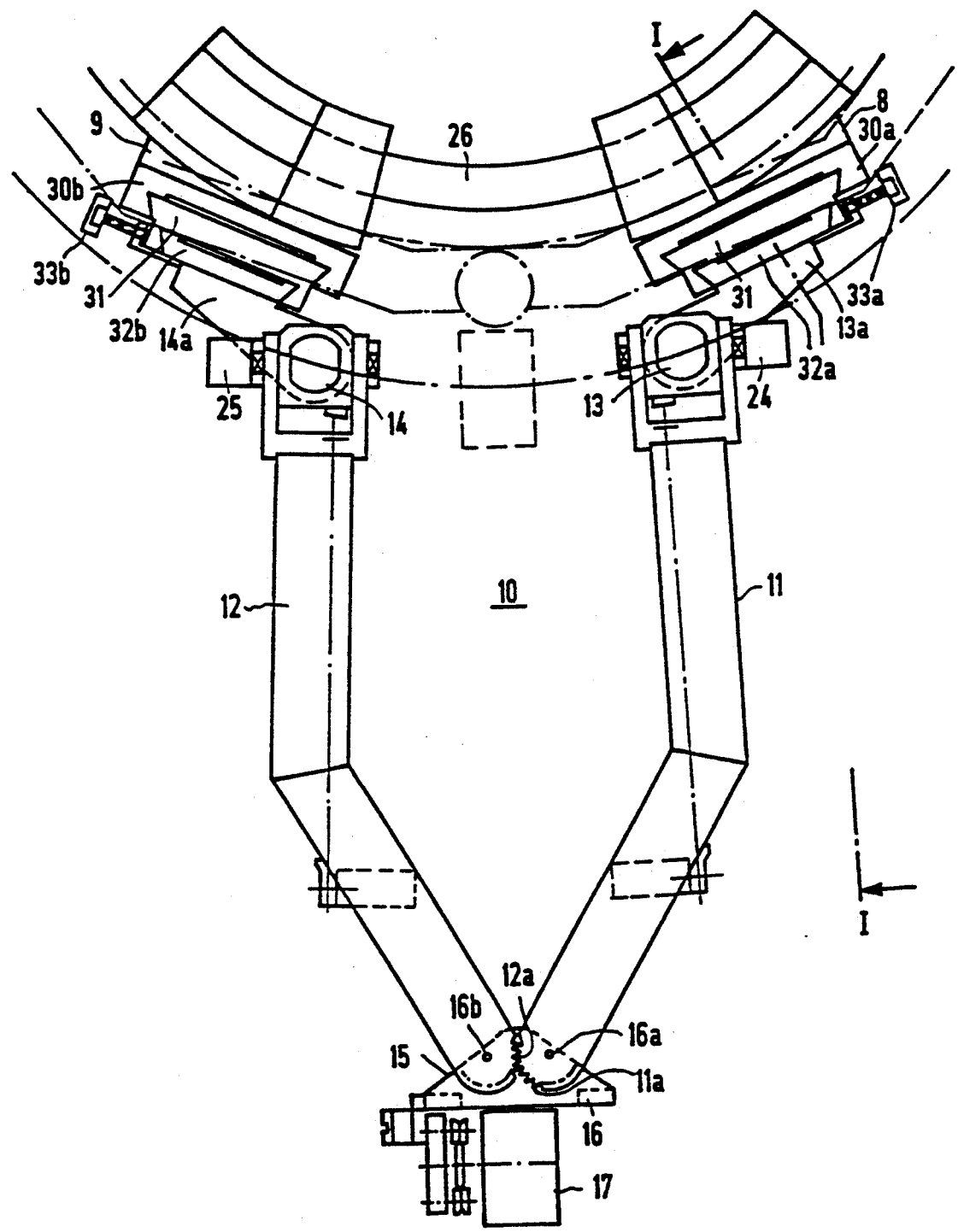
FIG. 2 is a front-elevational view of the manipulator of FIG. 1.

As can be seen in FIGS. 1 and 2, a manipulator 7 includes two trolleys 8, 9 that are movable circumferentially around the connection piece 2, and a jointed-shank arm 10 which pivots like scissors. This jointed-shank arm 10 has two shanks 11, 12, which are each supported at one end in a respective hinged support 13, 14 disposed on the trolleys 8, 9, with the hinged support being constructed as a cardan joint or ball and socket joint. The other ends of the shanks 11, 12 are joined together by a crown hinge 15. A support 16 with a test head 17 is disposed on the crown hinge 15.

The crown hinge 15 advantageously includes one toothed ring segment 11a, 12a on the end of each respective one of the shanks 11, 12. The toothed ring segments 11a, 12a mesh with one another. Center points of the toothed ring segments 11a, 12a are each supported in a respective pivot pin 16a, 16b. The pivot pins are mounted on the support 16. As a result, the support 16, upon a change in the angle between the two shanks 11, 12 and a resultant radial motion of the crown hinge 15, is always aligned in the axis between the shanks 11, 12 bisecting that angle. In other words, it maintains its same angular position.

The trolleys 8, 9 have the shape of a segment of a circle and are movable along an annular rail 26 circumferentially of the pipe 2. The trolleys 8, 9 are supported on the annular rail 26 by means of pairs of rollers 27a, 27b and are each driven by a respective electric motor 18, 19 with position encoders 20, 21. The motors 18 and 19 each act through a respective pinion 28a (28b) on a common circular rack 29.

A respective base plate 30a, 30b is disposed on each of the trolleys 8, 9, and a respective guide rail 31a, 31b is clamped thereon parallel to the axis of the connection piece 3 by means of a respective clamping device 31c, 31d. The jointed-shank arm 10 can be introduced on the guide rails. The guide rails 31a, 31b also serve to fix a distance between the hinged supports 13, 14 and a wall of the vessel 1. The hinged supports 13 and 14 of the jointed-shank arm are each connected through a respective web 13a, 14a to a shoe, 32a, 32b, which is guided adjustably in the axial direction of the pipe 2 in a dovetail-like recess of the respective guide rail 31a, 31b. A locking device 33a, 33b serves to fix the position.

Figure 3:
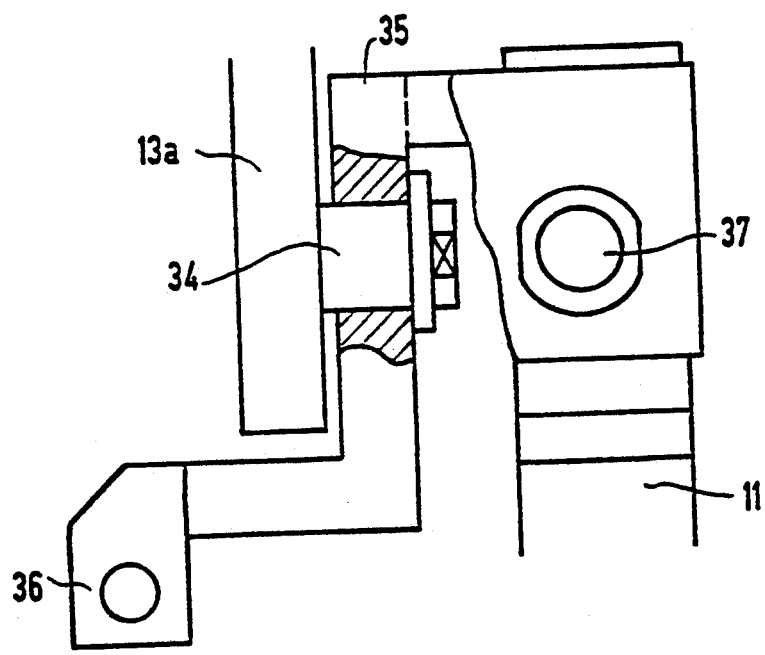
FIG. 3 is an enlarged, fragmentary, partly broken-away portion of a hinged support of the manipulator of FIG. 1.

One spring means 22, 23 is disposed between each of the shoes or carriages 32a, 32b and a respective one of the shanks 11, 12, in order to press the test head 17 or a tool against the wall region to be tested. The spring means 22, 23 may preferably be constructed as pneumatic or hydraulic cylinders. As FIG. 3 shows, a pivot pin 34 is disposed on the web 13a and a bracket 35 is rotatably supported on the pivot pin 34. An eyelet 36 is disposed on the bracket 35 for rotatably retaining the spring means 22. A pivot pin 37 on which the shank 11 is supported, is also secured to the bracket 35. The configuration forms a cardan joint.

At least one angle encoder 24 and/or 25 for detecting the inclination of at least one of the shanks 11 or 12 relative to a reference plane, is provided on the hinged supports 13, 14. The motors 18, 19, the associated position encoders 20, 21 and the angle encoders 24, 25 are connected to a control device 34' containing an arithmetic unit 35', for the trolleys 8, 9.

The crown hinge 15 is moved radially into a predetermined position by varying the position of at least one of the trolleys 8, 9, by means of the control device 34' acting upon the drive motors 18, 19. By moving both of the trolleys 8, 9 simultaneously and in the same direction, the test head 17 or a tool can be moved along a curve having a center which is located in the axis of the connection piece 3. Through the use of a different coordinated control of the drive motors 18, 19, an arbitrary testing path can be established in the radial direction and in the circumferential direction of the connection piece.

For removal (tool changing, test head changing), the two trolleys 8, 9 are moved far enough apart that the jointed-shank arm 10 rests almost on the connection piece 3 (in the position shown in dashed lines in FIG. 2). The spring means 22, 23 are then relaxed, or the pneumatic or hydraulic cylinders are retracted, so that the test head 17 no longer rests on the vessel wall and the jointed-shank arm 10, after release of the clamping device 31c, 31d, with the guide rails 31a, 31b, is removed from the opening 6.

We claim:

1. In a nuclear power plant including a primary loop having a vessel with a connection piece, a manipulator for working in the vicinity of the connection piece, comprising:

two trolleys being moveable circumferentially of the connection piece, a jointed-shank arm disposed on said trolleys, said jointed-shank arm including two shanks each having first and second ends, hinged supports each being disposed on a respective one of said trolleys and each supporting the first end of a respective one of said shanks, a crown hinge joining together the second ends of said shanks, and a support for a tool or a test head being mounted on said crown hinge.

2. The manipulator according to claim 1, wherein the second ends of said shanks have mutually meshing toothed ring segments with center points, and said support has pivot pins mounted thereon for supporting said toothed ring segments at said center points.

3. The manipulator according to claim 1, including two spring means each being disposed between a respective one of said trolleys and a respective one of said shanks for pressing the tool or test head against a region to be tested, and at least one angle encoder for detecting an inclination of at least one of said shanks relative to a reference plane.

4. The manipulator according to claim 3, wherein said spring means are pneumatic or hydraulic cylinders.

5. The manipulator according to claim 3, including two drive motors each having a position encoder and each being associated with a respective one of said trolleys, and a control unit having an arithmetic unit and being connected to said position encoders and to said angle encoders for controlling said drive motors.

6. The manipulator according to claim 1, wherein said hinged supports are cardan joints.

7. A process for carrying out work in a connection-piece region of a vessel of a primary loop in a nuclear power plant with a maneuvering unit including two trolleys being moveable circumferentially of the connection piece, hinged supports each being disposed on a respective one of the trolleys, a crown hinge, a jointed-shank arm on the trolleys including two shanks each having one end supported in a respective one of the hinged supports and another end being joined together by the crown hinge, and a support for a tool or a test head being mounted on the crown hinge, comprising the steps of:

adjusting a position of each of the trolleys with a respective drive motor;

pressing the tool or test head against a wall of the vessel with spring means acting upon the shanks; and maneuvering the crown hinge into at least one of a predetermined position and a predetermined path by varying the position of at least one of the trolleys with a control device acting upon the drive motors.

8. The process according to claim 7, which comprises pressing the tool or test head against the wall of the vessel with the spring means in the form of pneumatic or hydraulic cylinders.

* * * * *